(No Model.) 3 Sheets—Sheet 1.
J. G. HORSEY.
MACHINERY FOR MAKING BROOMS AND BRUSHES.
No. 333,946. Patented Jan. 5, 1886.
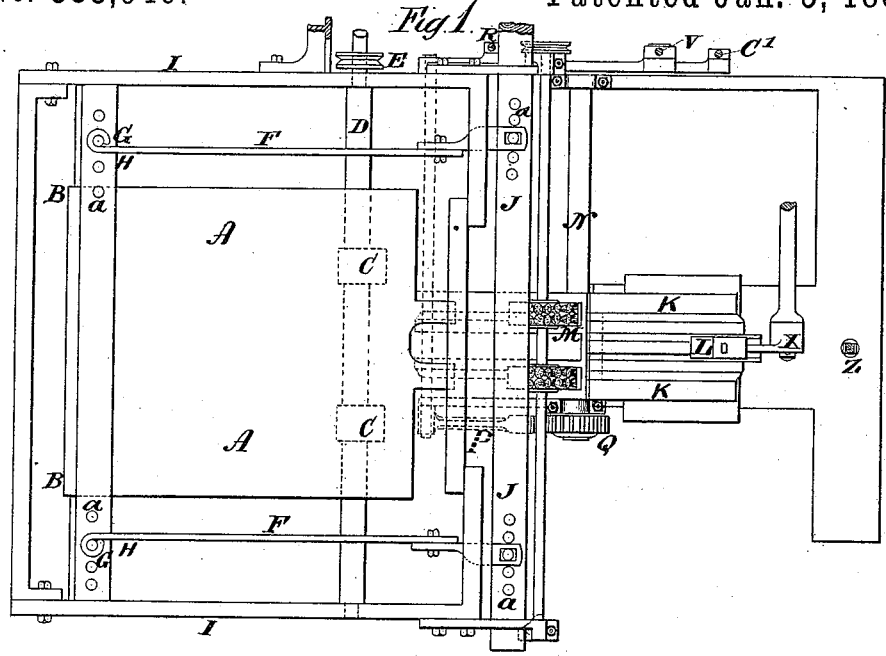
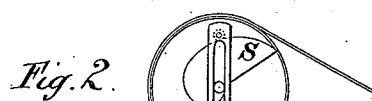
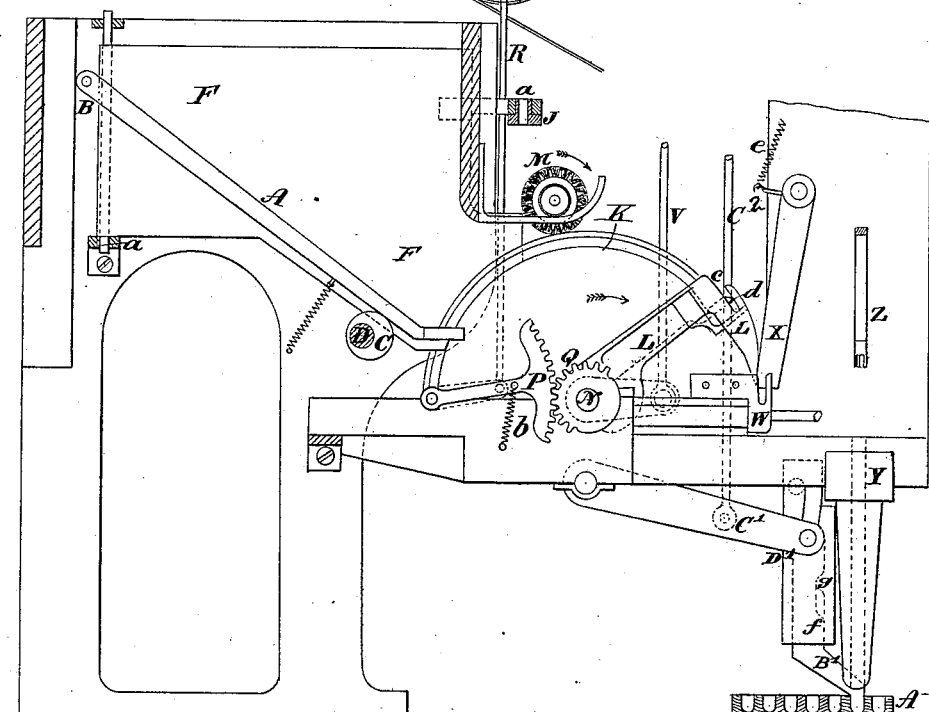
Witnesses,
J. A. Rutherford
Robert Everett
Inventor,
John G. Horsey,
By James L. Norris,
Atty.

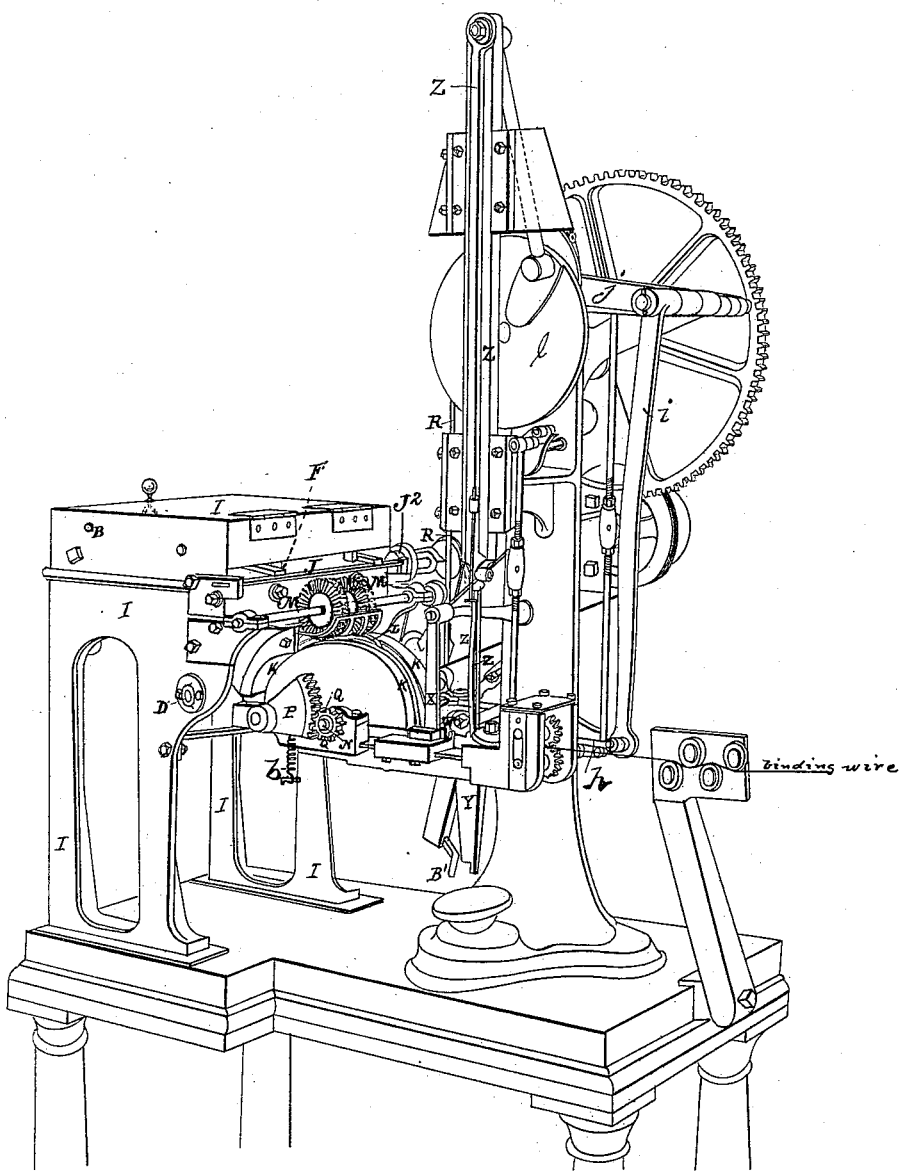

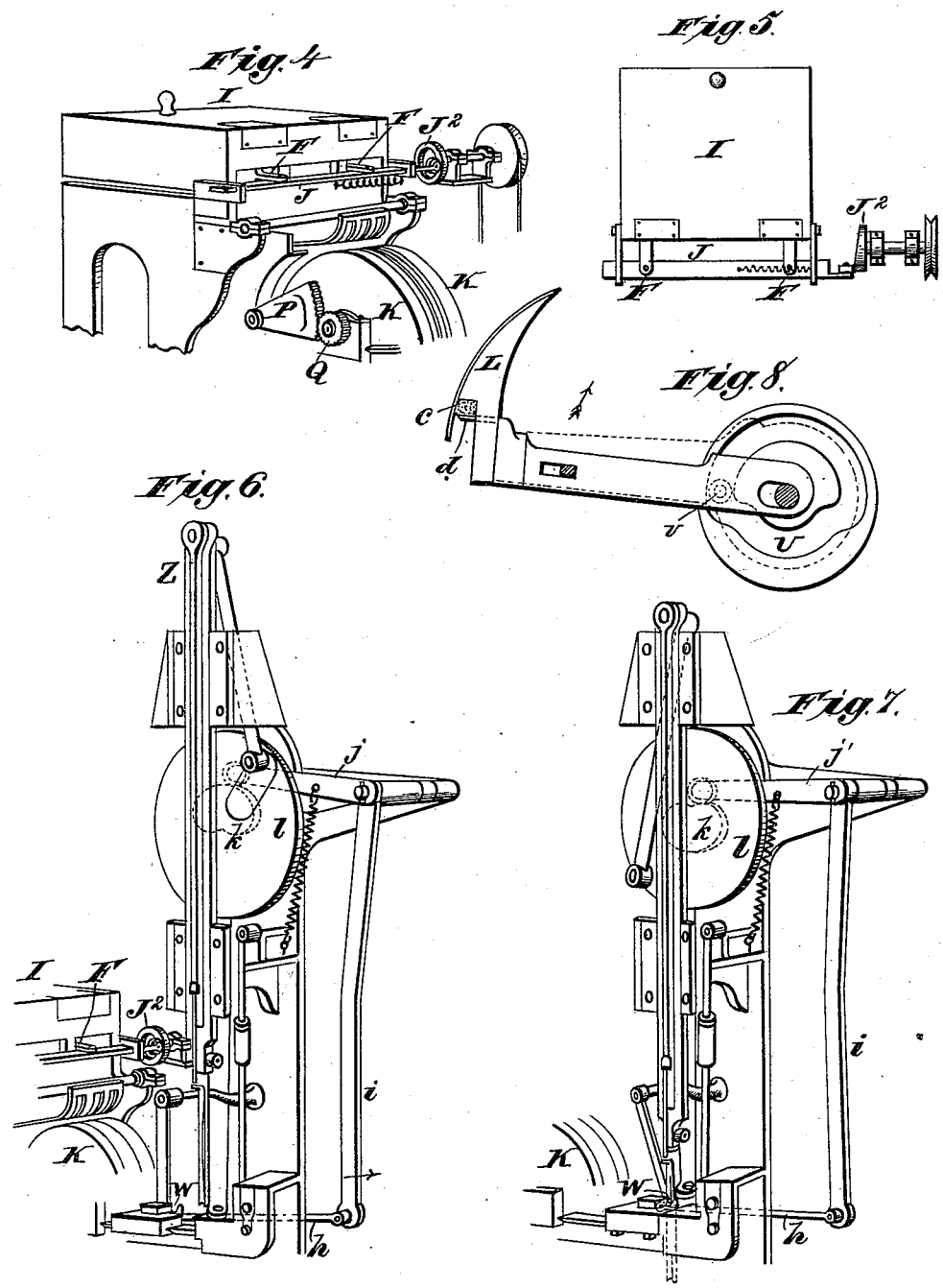

United States Patent Office.

JOHN GEORGE HORSEY, OF LONDON, ENGLAND.

MACHINERY FOR MAKING BROOMS AND BRUSHES.

SPECIFICATION forming part of Letters Patent No. 333,946, dated January 5, 1886.

Application filed August 11, 1883. Serial No. 103,496. (No model.) Patented in England March 14, 1882, No. 1,241; in France September 14, 1882, No. 151,083; in Germany October 19, 1882, No. 3,182; in Belgium October 24, 1882, No. 59,377, and in Denmark October 27, 1882.

*To all whom it may concern:*

Be it known that I, JOHN GEORGE HORSEY, a subject of the Queen of Great Britain, residing at London, England, have invented new and useful Improvements in Machinery for Manufacturing Brooms and Brushes, (for which I have obtained patents in the following countries, viz: Great Britain, No. 1,241, dated March 14, 1882; France, No. 151,083, dated September 14, 1882; Germany, No. 3,182, dated October 19, 1882; Belgium, No. 59,377, dated October 24, 1882, and Denmark, dated October 27, 1882,) of which the following is a specification.

My invention relates to certain features in machinery by which the bristles and other fibrous-like bodies are knocked up and kept in position with their ends in regular order in a vibratory and shaking box or hopper and ready to be taken in small quantities by a reciprocating tuft-extractor and conveyed by it to a receiver and thence to a guide in succession and forced by a plunger in a folded state down a guide into a hole of the brush-stock, this being arranged by hand on an adjustable table and gaged in position by a finger. The catch in the extractor is adjustable, and can be set to measure out any size of tuft required.

The invention is clearly shown in the annexed drawings, and will be understood by the following description of the operation or working of the machine.

Figure 1 is a plan view of so much of a brush-machine as is necessary to explain my improvements. Fig. 2 is a sectional side elevation of the parts shown in Fig. 1. Fig. 3 is a perspective view of a complete machine for making brushes or inserting bristles in brush-backs, showing my improvements in position. Fig. 4 is a perspective view of parts of the machine, to illustrate cam $J^2$. Fig. 5 is a plan of Fig. 4 with parts omitted. Fig. 6 is a perspective of part of the machine, showing the receiver W in one position. Fig. 7 is a similar view showing the receiver in another position. Fig. 8 is a detailed view of the tuft-extractor and its cam.

The bottom A of the hopper is hinged at B, and receives an up-and-down or jogging motion by the eccentric or cam C, which is mounted on the spindle D, and receives rotation by band on the pulley E, or by any well-known means.

F F are end pieces, pivoted at G G on the fixed cross-bar H of the frame I, so that they may move to and fro by the slide-bars J, to which their opposite ends are secured loosely. This bar has a stud working in a cam, $J^2$, to impart the necessary motion for evening the ends of the bristles or fibers. These end plates or pieces, F F, can be shifted onto any of the pins $a$ $a$ to suit different lengths of fibers, as desired. The fibers, from the jogging and knocking-up motions they receive, bear by their own weight only, without any compression, on the edge faces of two rounded plates, K K, which also serve to guide the tuft-extractor L in its segmental motion, the rotating brushes M M preventing the escape of any fibers that may have become loose from the action of the extractor L. The extractor L is mounted loosely on the shaft N, and its movement is governed by the quadrant P, whose teeth gear into the pinion Q for that purpose, the forward movement being obtained by the rod R from the wiper or cam S, as shown in Fig. 2, the reverse or backward movement being obtained by the spring $b$. The tuft-extractor yields to the quantity of fiber that may be in the hopper, and only travels back to take its supply, which it effects, whether the hopper be full or comparatively empty. Consequently its action is always guaranteed automatically while any fiber remains in the hopper. The extractor L receives its supply of fiber in the slot $c$, this being provided with a catch-pin, $d$, carried by the extractor-arm, and arranged to move along the body of said extractor-arm by a bowl, $v$, riding in a cam, U, Fig. 8, which causes it, after the extractor has entered the fiber, to suddenly shoot out into the slot to separate a quantity of fiber to form a tuft, which is retained therein. In this condition the extractor and the catch-pin carry the tuft to the receiver W. The bowl $v$ then, by the shape of the cam U, again draws back the catch to release the tuft, which is deposited in the receiver and held therein by the strip X, which lodges itself on the tuft under the action on the spring e, the lower end of the strip X having been pushed clear of the receiver by the curved end of the extractor in its forward downward movement.

The receiver W has a to-and-fro movement imparted to it through rod h, pitman i, and arm j, resting at one end on cam k, secured to rotating disk l, to carry the tuft over the guide Y, so that it can be forced by the plunger Z into and through said guide, folded into the hole in the brush-stock A', arranged on a table beneath, the hole of the brush-stock having been previously gaged in position by the finger B'. The finger B' has an up-and-down motion imparted to it by the lever C' and connecting-rod C², and as it rises in its socket D' a lug, f, on it strikes against the projection g, and is thereby kicked out of the way, so that the tuft may be lodged in the brush-stock. A spring (not shown) returns the finger to its first position on its return, to gage the next hole for the succeeding tuft. The tufts are secured within the brush-stock by means of wire applied in any convenient manner.

Having fully described my invention, what I desire to claim and secure by Letters Patent is—

1. In a brush-machine, the combination of a bristle receiver or hopper having a vertically-jogging bottom and laterally-shaking bars for evening the fibers and keeping them in a loose condition, a vibrating tuft-extractor for taking the bristles from the hopper, and a reciprocating receiver to receive the bristles from said extractor, substantially as described.

2. In a brush-machine, the combination of the bristle receiver or hopper, the curved guides, the vibrating tuft-extractor, the reciprocating receiver, the guide to receive the tuft from said receiver, and the plunger to pass the tuft through the guide, substantially as described.

3. In a brush-machine, the combination of the bristle-hopper, the vibrating extractor, the reciprocating receiver, the tuft-guide, the plunger to pass the tuft through the guide, and the automatic gaging-finger for setting the hole in the brush-stock under the tuft-plunger, substantially as described.

4. In a brush-machine, the combination of the bristle-hopper, the vibrating tuft-extractor, the pinion Q, quadrant P, and spring b, substantially as described.

5. In a brush-machine, the combination, with the tuft-guide Y and plunger Z, of the gage-finger B', provided with lug f, the finger-socket D', formed with projection g, and a lever for moving said finger, substantially as described.

JOHN GEORGE HORSEY.

Witnesses:
JOSEPH LANGTON,
37 Queen Victoria Street, London, Solicitor.
ROBERT TARR,
Clerk to Mr. Joseph Langton.